United States Patent [19]
Pulley

[11] Patent Number: 5,317,807
[45] Date of Patent: Jun. 7, 1994

[54] WHEELED SUPPORT STRUCTURE FOR LAWN STRING TRIMMERS

[75] Inventor: Bobby L. Pulley, Springfield, Mo.

[73] Assignee: Finger Concepts, Inc., Springfield, Mo.

[21] Appl. No.: 934,388

[22] Filed: Aug. 25, 1992

[51] Int. Cl.⁵ ............................................. A01D 34/74
[52] U.S. Cl. ................................. 30/296.1; 30/275.4; 56/12.7
[58] Field of Search ...................... 30/276, 296.1, 297, 30/298, 298.4, 275.4; 56/12.7, 16.7, 17.1, 17.2, ; 403/190, 191, 195, 199, 407.1

[56] References Cited

U.S. PATENT DOCUMENTS

| | | | |
|---|---|---|---|
| 4,007,993 | 2/1977 | Schwartz | 403/191 |
| 4,182,100 | 1/1980 | Letter | 56/17.1 |
| 4,922,694 | 5/1990 | Emoto | 56/16.7 |
| 5,092,112 | 3/1992 | Buckendorf, Jr. | 56/12.7 |
| 5,095,687 | 3/1992 | Andrew et al. | 30/296.1 |
| 5,119,690 | 6/1992 | Shu | 403/191 |

*Primary Examiner*—Richard K. Seidel
*Assistant Examiner*—Hwei-Siu Payer
*Attorney, Agent, or Firm*—Nixon & Vanderhye

[57] ABSTRACT

A wheeled support structure assists in supporting a cutting head of a string trimmer within a cutting plane which is parallel to, but vertically spaced above, ground surface. The wheeled support structure includes a wheel, and an extension shaft having an upper end which is connectable to a main shaft of the string trimmer rearwardly of the cutting head, and a lower end which is journally coupled to the wheel. In such a manner, the wheel is oriented in a rolling plane which is substantially transverse to the cutting plane within which the cutting head of the string trimmer is supported, and is capable of rolling movement over the ground surface. The wheel thereby establishes a point about which the cutting head of the string trimmer may be pivoted by an operator while assisting the operator in maintaining the cutting head of the string trimmer within the cutting plane. Vegetation can thus be cut by the cutting head of the string trimmer at a substantially uniform height throughout an arcuate segment.

5 Claims, 3 Drawing Sheets

WHEELED SUPPORT STRUCTURE FOR LAWN STRING TRIMMERS

FIELD OF INVENTION

The present invention is generally related to the field of lawn string trimmers. More specifically, the present invention is related to law string trimmers which include supplemental support structures.

BACKGROUND AND SUMMARY OF THE INVENTION

Lawn string trimmers are widely used as a means to trim vegetation in areas not easily accessible to lawn mowers. However, conventional lawn string trimmers must be supported physically by the user above the ground so that the vegetation is trimmed at the desired height. Prolonged use of conventional lawn trimmers, therefore, is quite fatiguing.

In addition, it is difficult for a user to support the lawn trimmer to achieve a constant cutting height resulting in height variations of the cut vegetation. As a result, the use of lawn trimmers is typically reserved for those vegetation regions where such height variations will not be noticed and/or that cannot be reached by other powered trimming tools.

The art has recognized the problems associated with conventional lawn string trimmers briefly described above and has proposed a variety of devices which provide supplemental support for the lawn string trimmer during use. For example, in U.S. Pat. No. 4,894,916 to Nimz et al, a single wheel support structure is provided which is attached to the shaft of a lawn string trimmer so as to provide rolling support of the trimmer cutting head over the surface of the ground.

The wheel of the support structure proposed by the Nimz et al '916 patent, moreover, is oriented so that it remains in a plane that is parallel to the cutting plane of the trimmer's head. That is, according to the Nimz et al patent, the wheel is mounted for rolling movement to the plate bracket via a cotter pin which inserted through a rigidly fixed axle. As a result of such orientation, the support wheel of the Nimz et al '916 patent may be brought to bear against a vertical surface (in which case the trimmer's cutting head is supported in a horizontal plane) or a horizontal surface (in which case the trimmer's cutting head is supported in a vertical plane).

As can be appreciated from the prior art represented by the Nimz et al '916 patent, the orientation of the support wheel precludes movement of the string trimmer along the ground surface so as to trim vegetation along a substantially constant horizontal cutting plane in the absence of a vertical surface being present. Thus, the supplemental trimmer support structure proposed by the Nimz et al '916 patent is unsuitable for use in trimming vegetation in a relatively open space.

It would therefore be quite advantageous if supplemental support structures were provided which enables a lawn string trimmer to be supported a relatively fixed distance above the ground's surface and which could be rolled easily along such surface to allow a relatively open expanse of vegetation to be trimmed at a desired fixed height. It is towards providing structure which attains such advantages that the present invention is directed.

Broadly, the present invention is embodied in a wheeled support structure for lawn string trimmers whereby the support caster is oriented in a vertical plane which is perpendicular to the horizontal cutting plane of the string trimmer. More specifically, the present invention includes an elongate extension rod having an upper end fixed (preferably by means of a removable bracket assembly) to the shaft of the trimmer. A ground-engaging caster is mounted to the opposite end of the extension rod such that the extension rod (and hence the trimmer to which it is attached) is capable of swivelling movement relative to the ground.

The extension rod is of sufficient length so that the operator can maintain the cutting head of the trimmer in substantial parallel alignment with the ground. Moreover, as noted briefly above, the journalled attachment of the caster to the lower end of the extension rod is such that the caster wheel is oriented in a plane which at all times is transverse to the cutting plane of the trimmer head. In this manner, therefore, the support structure of this invention allows the operator to supportably move the trimmer over the ground and easily change the direction of such movement without disrupting the substantially parallel orientation between the cutting head and the ground being trimmed. As a result, the vegetation on the ground can be trimmed to a substantially uniform level.

Further aspects and advantages of this invention will become more clear after careful consideration is given to the following detailed description of the preferred exemplary embodiment thereof.

BRIEF DESCRIPTION OF THE ACCOMPANYING DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENTS

Figure 1:
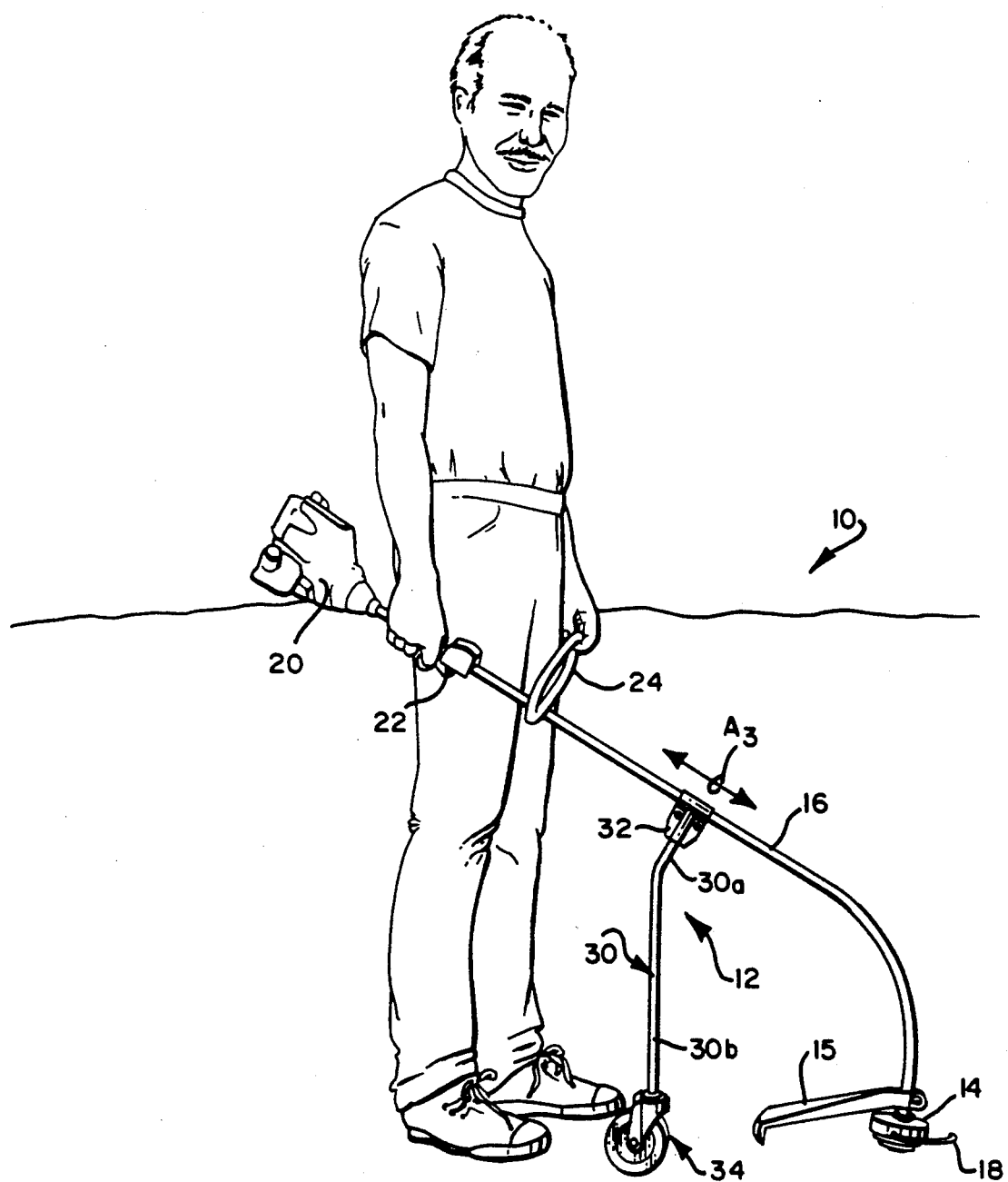
FIG. 1 is a perspective view showing a lawn string trimmer equipped with the wheeled support structure of this invention while in use.

Accompanying drawing FIG. 1 shows a lawn string trimmer 10 equipped with a wheeled support structure 12 according to the present invention. In this regard, the lawn string trimmer 10 is, in and of itself, conventional in that it includes a rotatable cutting head 14 mounted at a distal end of a main shaft 16. The cutting head 14 is provided with a supply of string cutting element 18 which is most preferably a synthetic monofilament, such as nylon. The cutting head 14 rotates relative to the main shaft 16 at high speed so as to cause the string cutting element 18 to trim vegetation in its path.

The cutting head 14 is driven by any suitable motive means. For example, the string trimmer 10 shown in FIG. 1 includes a gas-powered engine 20 mounted at the proximal end of the main shaft 16. The driven output of the engine 20 is thus mechanically linked to the cutting head 14 through the main shaft 16 by means not shown so as to cause the cutting head 14 (and hence the string cutting element 18) to rotate at high speed. Typically, a guard plate 15 will be associated with the distal end of the main shaft 16 near the cutting head 14 so as to guard against debris being thrown rearwardly towards the user. A clutch trigger 22 may be mounted near the proximal grip region of the main shaft 16 to allow the user to selectively engage the driven output of the motor 20 with the cutting head 14 and thereby control the cutting action of the string cutting element 18. A forward grip 24 is provided on the main shaft 16 to allow the user to support the trimmer 10.

The string trimmer 10 could, however, include motive means other than the gas-powered engine 20 depicted in FIG. 1. For example, a number of conventional string trimmers are powered by an electric motor which is mounted in close proximity to the cutting head 14 at the distal end of the main shaft 16. The wheeled support structure 12 according to this invention can be used with any conventional string trimmer and thus is not limited to use in combination with a gas-powered string trimmer which just happens to be depicted in the accompanying drawing FIGURES.

The wheeled support structure 12 of this invention generally includes an extension rod 30 which is rigidly coupled at its upper end 30a to the main shaft 16 of the string trimmer 10 by a T-coupler 32, and is supported at its lower end 30b for rolling movement over the ground's surface by a caster assembly 34. In this regard, the upper and lower ends 30a and 30b, respectively, are bent at an angle relative to one another so that the upper end 30a is joined to the main shaft 16 at substantially a right angle, whereas the lower end 30b is oriented at substantially a right angle with the horizontal ground surface. The relative angle between the upper and lower ends 30a and 30b, respectively, may be provided as needed so as to accomodate a variety of conventional string trimmers. Typically, however, the angle formed between the upper and lower ends 30a and 30b, respectively, will be between about 135° to about 165°.

Figure 2:
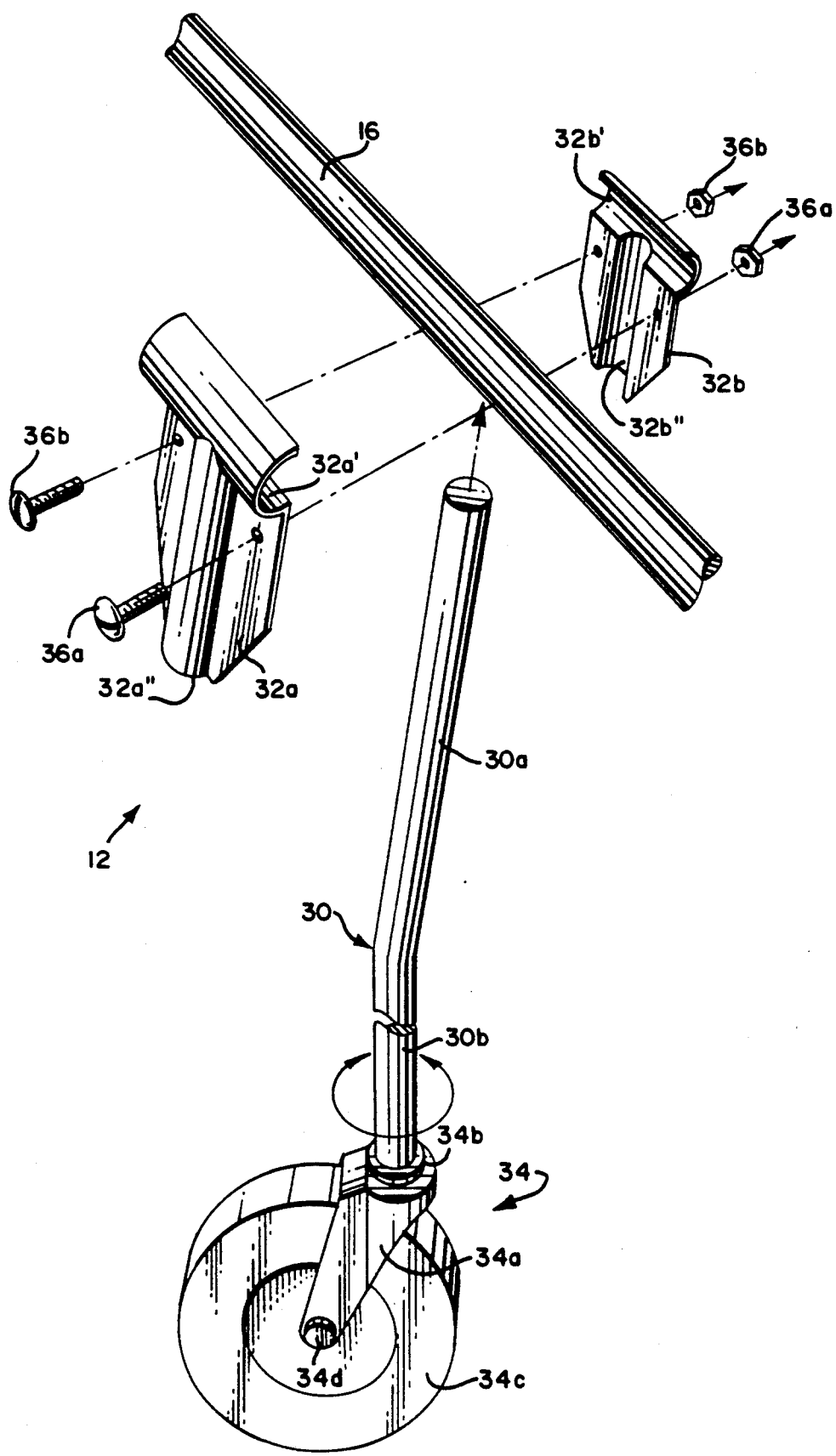
FIG. 2 is an exploded perspective view showing the preferred component parts of the wheeled support structure according to this invention.

As is perhaps better shown in accompanying FIG. 2, the T-coupler 32 is most preferably a two-piece structure which includes mateable clamp plates 32a, 32b. The clamp plates 32a, 32b each define an upper channel 32a', 32b' and a lower channel 32a'', 32b''. The upper channels 32a', 32b' and lower channels 32a'', 32b'' collectively surround the periphery of the main shaft 16 and the extension shaft 30, respectively, so as to couple these two shafts 16 and 20 one to another. The clamping plates are held in place by removable nut an bolt assemblies 36a, 36b, respectively.

The caster assembly 34 includes a bracket 34a which is fixed to the lower end of the extension shaft 30 by a journalled coupling 34b so as to allow the caster bracket 34a to swivel 360° about the axis of the lower end 30b of the extension shaft 30. Rolling support along the ground's surface is provided by a ground-engaging wheel 34c which is rotatably connected to the bracket 34a by axle pin 34d.

Figure 3:
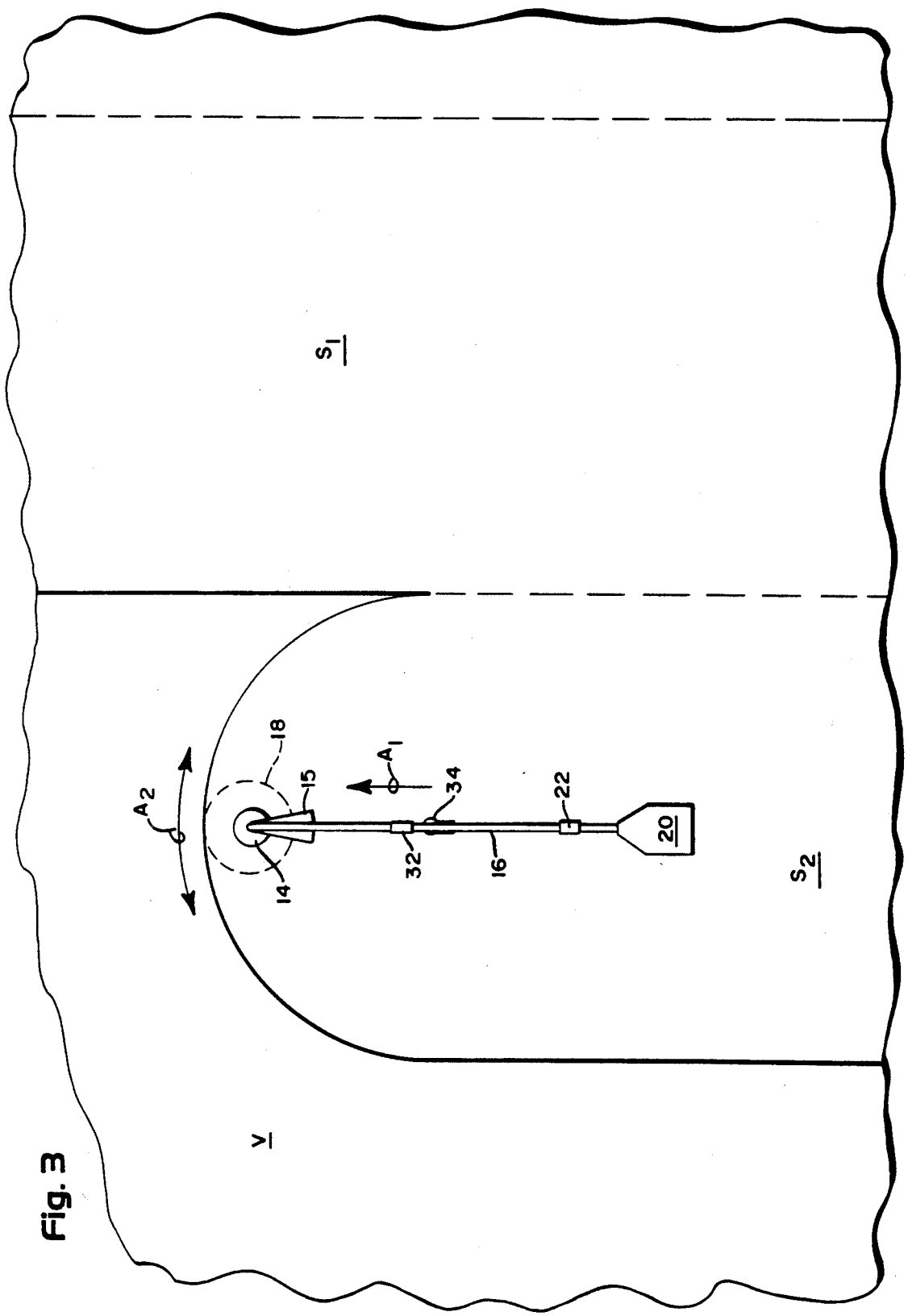
FIG. 3 is a plan view of a lawn string trimmer equipped with the wheeled support structure of this invention and particularly showing one manner in which vegetation may be trimmed thereby.

It will be appreciated that the orientation of the wheel 34c is in a plane perpendicular to a cutting plane established by the rotating string cutting element 18. As a result, the wheel 34c may be advanced over the ground's surface as shown by arrow $A_1$ in FIG. 3. At the same time, however, the cutting head may be pivoted about the axis of the extension shaft 30 by virtue of the journalled coupling 34b. As a result, the string cutting element 18 may be swept through an arc as indicated by the arrow $A_2$ in FIG. 3. Thus, relatively wide swaths $S_1$, $S_2$, etcetera, may be cut through the vegetation V. Moreover, the relative orientation of the wheel 34c and the string cutting element 18 (i.e., in mutually transverse planes) as well as the pivotal and rolling movement which the wheeled support structure 12 provides, enables the vegetation V to be cut as substantially a constant height.

The height at which the vegetation may be cut can be selectively varied by adjustably moving the T-coupler 32 proximally or distally along the main shaft 16 (i.e., as shown by arrow $A_3$ in FIG. 1). That is, the nut and bolt assemblies may be loosened slightly (i.e., so as to release the clamping force exerted by the clamp plates 34a, 34b against the main shaft 16) and then sliding the T-coupler 32 in the desired direction along shaft 16. It will be appreciated that movement of the T-coupler 32 in a distal direction along shaft 16 causes the cutting head 14 to be vertically raised relative to the ground's surface, whereas movement of the T-coupler 32 in a proximal direction along shaft 16 causes the cutting head 14 to be lowered relative to the ground's surface.

As is now apparent, the wheeled support structure according to the present invention provides advantages not achieved by prior art attempts to assist a user in supporting the cutting head of a lawn string trimmer in a plane which is spaced a desired distance above the ground's surface. However, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a lawn string trimmer having a main shaft which is graspable by a user, a rotatable string cutting head disposed at a distal end of said main shaft, and a motor for rotating the cutting head at high speed so as to trim vegetation in a substantially horizontal cutting plane which is vertically spaced above ground surface, the improvement comprising a wheeled support structure attached to said main shaft to assist a user in supporting said cutting head at a desired height above ground surface so as to allow vegetation to be trimmed within said cutting plane, said wheeled support structure including;

an extension shaft having upper and lower ends;

a T-coupler for coupling said upper end of said extension shaft at substantially a right angle relative to said main shaft such that (i) said extension shaft downwardly extends from said main shaft and collectively establishes with said main shaft a vertical plane which is normal to said cutting plane and (ii) said T-coupler is movable along said main shaft towards and away from said cutting head to allow for selective repositioning of said T-coupler along said main shaft within said established vertical plane so as to responsively allow height adjustment of said cutting plane relative to the ground surface; and a wheel which is journalled to said lower end of said extension shaft so as to be coplanar with said vertical plane established by said main and extension shafts, said wheel allowing the user simultaneously to roll said string trimmer over said ground surface and swivel said string trimmer about a vertical axis established by said extension shaft.

2. In a lawn string trimmer as in claim 1, wherein said T-coupler includes a pair of clamp plates which collectively define mutually perpendicular channels to receive a respective one of said upper end of said extension shaft and the main shaft of the string trimmer.

3. In a lawn string trimmer as in claim 2, wherein said pair of clamp plates are coupled to one another and to said upper end of said extension shaft and the main shaft of the string trimmer by at least one bold and nut assembly.

4. In a lawn string trimmer as in claim 1, wherein said extension shaft is bent between said upper and lower ends thereof such that said upper end is connectable to the main shaft at substantially a right angle and said lower end is oriented at substantially a right angle relative to the ground surface.

5. In a lawn string trimmer as in claim 4, wherein said extension shaft is bent so as to form an angle of between about 135° to about 165° between said upper and lower ends thereof.

* * * * *